United States Patent
Krökel et al.

(10) Patent No.: US 8,391,558 B2
(45) Date of Patent: Mar. 5, 2013

(54) METHOD FOR THE ADAPTIVE DETERMINATION OF A THRESHOLD VALUE FOR THE IDENTIFICATION OF VEHICLE LIGHTS USING A CAMERA SYSTEM

(75) Inventors: Dieter Krökel, Eriskirch (DE); Thomas Fechner, Wasserburg (DE); Carlos Almeida, Lindau (DE); Christian Schaale, Weissensberg (DE)

(73) Assignee: ADC Automotive Distance Controls Systems GmbH (DE)

( * ) Notice: Subject to any disclaimer, the term of this patent is extended or adjusted under 35 U.S.C. 154(b) by 253 days.

(21) Appl. No.: 12/739,477

(22) PCT Filed: Oct. 16, 2008

(86) PCT No.: PCT/DE2008/001675
§ 371 (c)(1),
(2), (4) Date: Aug. 27, 2010

(87) PCT Pub. No.: WO2009/052786
PCT Pub. Date: Apr. 30, 2009

(65) Prior Publication Data
US 2010/0316258 A1 Dec. 16, 2010

(30) Foreign Application Priority Data
Oct. 25, 2007 (DE) .......... 10 2007 051 387

(51) Int. Cl.
G06K 9/00 (2006.01)
G08B 5/00 (2006.01)
G08G 1/017 (2006.01)
(52) U.S. Cl. .......... 382/104; 340/332; 340/937
(58) Field of Classification Search .......... 382/104; 340/332, 457.2, 468, 545.3, 555, 641, 815.45, 340/815.66, 815.75, 815.77, 956, 982, 985; 701/1, 22, 36, 50; 348/148, 149
See application file for complete search history.

(56) References Cited

U.S. PATENT DOCUMENTS

| 6,856,873 | B2 * | 2/2005 | Breed et al. ............ 701/45 |
| 7,859,432 | B2 * | 12/2010 | Kim et al. ............ 340/937 |
| 2004/0069931 | A1 | 4/2004 | Stam et al. |
| 2010/0026806 | A1 | 2/2010 | Heinrich et al. |

FOREIGN PATENT DOCUMENTS

| EP | 1 837 803 A2 | 9/2007 |
| WO | WO 2008/064621 A1 | 6/2008 |

* cited by examiner

Primary Examiner — Abolfazl Tabatabai
(74) Attorney, Agent, or Firm — RatnerPrestia

(57) ABSTRACT

A method for determining at least one threshold value S for distinguishing, in the dark, between reflectors and vehicle lights that are recorded as light spots by a camera sensor oriented towards the surroundings of a vehicle. The camera sensor records a series of images of the surroundings of the vehicle. At least one light spot in the series of images is tracked. When the tracking of a light spot is completed, at least one parameter (for example the maximum intensity $I_{max}$ of the light spot in the entire series of images, or the lifetime $\tau$ of the light spot) is determined from measured values, for example from the intensity of the light spot in each image. The threshold value S is then adapted to the determined parameter/s. The determined parameter value of the light spot is included in a frequency distribution of the parameter values from previously tracked light spots. A new threshold value for distinguishing between vehicle lights and reflectors is determined from the updated frequency distribution of the parameter values. After temporal filtering a new threshold value for distinguishing between reflectors and vehicle lights is fixed.

5 Claims, 2 Drawing Sheets

METHOD FOR THE ADAPTIVE DETERMINATION OF A THRESHOLD VALUE FOR THE IDENTIFICATION OF VEHICLE LIGHTS USING A CAMERA SYSTEM

CROSS REFERENCE TO RELATED APPLICATIONS

This application is the U.S. national phase application of PCT International Application No. PCT/DE2008/001675, filed Oct. 16, 2008, which claims priority to German Patent Application No. 10 2007 051 387.0, filed Oct. 25, 2007, the contents of such applications being incorporated by reference herein.

FIELD OF THE INVENTION

The invention relates to a method for determining at least one threshold value for distinguishing between oncoming vehicle lights and reflectors in the dark in the field of automatic light control in motor vehicles.

BACKGROUND OF THE INVENTION

The identification of vehicles at night is required particularly for an automatic light control in a vehicle. It is the aim of an automatic light control to control the intensity and/or direction of one's own vehicle headlights in such a manner that other road users are not dazzled.

An important feature for the identification of vehicles by means of a camera in the dark is the vehicle lighting of oncoming vehicles that is represented in the camera image by spots that have a high intensity.

WO 2008/064621 A1, which is incorporated by reference, shows a method for the identification of reflectors and vehicle lights by means of a camera sensor system in the surroundings of a vehicle. For this purpose, a sequence of images of the surroundings of the vehicle is recorded. At least one light spot in the sequence of images is tracked. The intensity of the light spot in the sequence of images is determined and analyzed. Light spots above a first threshold value are identified as vehicle lights, and light spots below a second threshold value are identified as reflectors.

It has turned out that with some specimens of a commercially available image sensor, this method with preset threshold values is lacking the desired reliability of the identification of vehicle lights/reflectors.

One reason for this is that each specimen of an image sensor has a slightly different sensitivity. On the other hand, the sensitivity of each image sensor is changing in time. These changes may be deteriorations in sensitivity caused by the degradation of, in particular, the colour filters (Bayer pattern) as well as increases in sensitivity, caused particularly by late curing of plastics in the visual range of the image sensor, which makes the field of view clearer.

SUMMARY OF THE INVENTION

An object of the present invention is a method that provides increased reliability of distinguishing between oncoming vehicle lights and reflectors for image sensors of different sensitivity over a long period of time.

At least one embodiment of the method for determining at least one threshold value for distinguishing, in the dark, between reflectors and vehicle lights that are recorded as light spots by a camera sensor oriented towards the surroundings of a vehicle comprises the following steps.

The camera sensor records a series of images of the surroundings of the vehicle. At least one light spot in the series of images is tracked. Afterwards (when the tracking of a light spot is completed) at least one parameter of the light spot in the series of images is determined from measured values, for example from the intensity of the light spot in each image. Suitable parameters are, for example, the mean intensity of the light spot, the maximum intensity of the light spot in the entire series of images, or the lifetime of the light spot. The maximum intensity typically corresponds to the final intensity, particularly for oncoming vehicles. The lifetime is determined by the number of individual images in which the light spot is tracked.

The threshold value for distinguishing between reflectors and vehicle lights in the dark is then adapted to the determined parameter/s. For this purpose, a frequency distribution for the at least one parameter of several light spots that have been tracked over several images is set up. The determined parameter value of this light spot is included in a frequency distribution of the parameter values from previously tracked light spots. A new threshold value for distinguishing between vehicle lights and reflectors is determined from the updated frequency distribution of the parameter values. This determination of a threshold value is based on different properties of the parameter values for vehicle lights and for reflectors.

On account of the fact that vehicle lights are already identified when they are far away, light spots of vehicle lights have a longer lifetime as well as a higher final intensity (maximum intensity) than other light spots in the image. Reflectors, however, are only detected at close range and so have a shorter lifetime than vehicle lights. Also, the maximum intensity of light spots of reflectors is usually lower than that of vehicle lights.

These or comparable different properties are taken into consideration when determining an optimum threshold value for a reliable decision on the basis of the present frequency distribution. If several parameters are taken into consideration, the threshold value will be dependent on several parameters. The threshold value will then assume the form of a boundary line or of a boundary area.

After temporal filtering, particularly after temporal low-pass filtering, a new threshold value for distinguishing between reflectors and vehicle lights is fixed. By temporal filtering, the threshold value is adapted to the current situation, wherein occasional freak values of determined parameter values are not overrated, which is prevented by temporal low-pass filtering, for example.

According to a preferred exemplary embodiment, the frequency distribution of the determined parameter values for vehicle lights and for reflectors is analyzed by applying methods of decision theory, and a new threshold value is fixed on the basis of this analysis. Suitable methods of decision theory are, for example, the analysis of a cost function or the maximum likelihood theory. It is the aim of these methods to fix the threshold value such that the number of false decisions is kept to a minimum.

According to a further preferred embodiment, the maximum intensity of a light spot is used as a parameter. The maximum intensity is referred to the course of the determined intensity value of a light spot over all individual images in which the light spot was tracked.

According to a further preferred embodiment, the lifetime of a light spot is used as a second parameter.

The invention includes a device for distinguishing between reflectors and vehicle lights in the dark in the surroundings of a vehicle. The device comprises a camera sensor and an evaluation unit. The evaluation unit evaluates the image data acquired by the camera sensor and applies, for this purpose, one of the described methods.

The advantage of the invention is the high adaptability to parameter changes that are occurring in time on account of changes of materials in the region of the camera sensor and/or in the glass arranged in front thereof, such as the windscreen. By means of the method, an adapted threshold value can be determined for each individual sensor specimen. This adaptation is cost-effective and reliable. An adaptation to reflectors and/or vehicle headlights of different brightness in various countries is also made possible by the inventive method.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
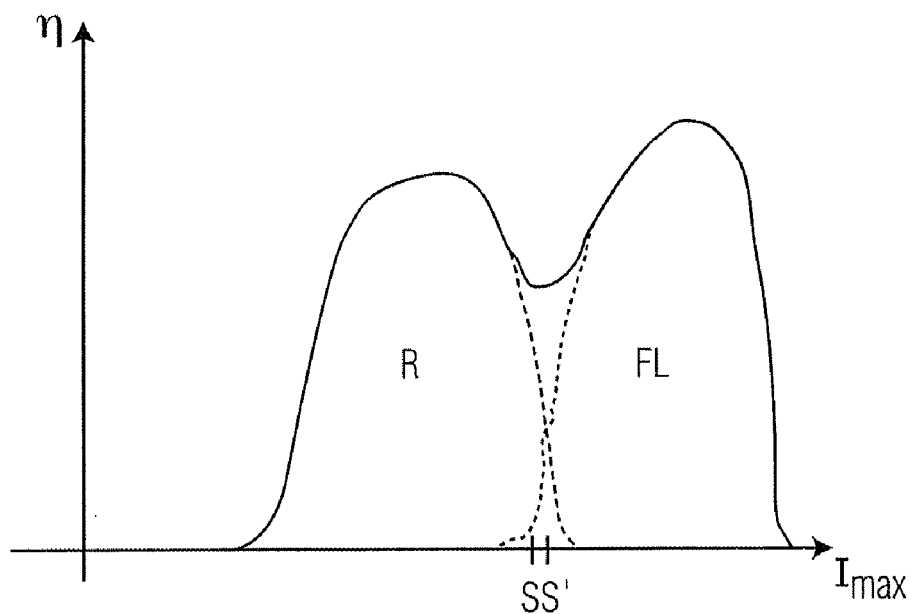
FIG. 1 is a schematic representation of a possible frequency distribution of the maximum intensities of light spots.

A schematic frequency distribution of the determined maximum intensities of light spots in FIG. 1 illustrates a first exemplary embodiment of the invention. The number n of the light spots with a maximum intensity $I_{max}$ is plotted here.

The maximum intensity $I_{max}$ of a light spot is referred to the course of the determined intensity value of a light spot over all individual images in which the light spot was tracked. The distribution shows two distinct maxima and a minimum therebetween.

Since the maximum intensity $I_{max}$ of a light spot caused by an oncoming vehicle light is, in the vast majority of cases, higher than the maximum intensity $I_{max}$ of a light spot caused by a reflector, the maximum with the higher maximum intensity $I_{max}$ is assigned to vehicle lights (FL) and the other maximum is assigned to reflectors (R).

The frequency distribution is now evaluated in order to determine a threshold value that separates the two regions (FL) and (R) of the maximum intensities $I_{max}$ for vehicle lights and reflectors from each other. For example, a first possibility consists in fixing the maximum intensity $I_{max}$ of the minimum of the distribution as a threshold value S.

In this way, a suitable threshold value S could be determined even if such a threshold value is not known before, provided that a sufficient frequency distribution has already been determined.

An alternative possibility of determining a threshold value S' consists in assuming one distribution of the maximum intensities $I_{max}$ for vehicle lights and one for reflectors and adapting these distributions to the determined overall distribution (fit method). This would correspond to the two dotted curve courses. In that case, a suitable threshold value S' would particularly be the intensity value $I_{max}$ where both light spot causes occur equally frequently, i.e. the point of intersection of the two individual distributions (dashed lines).

Figure 2:
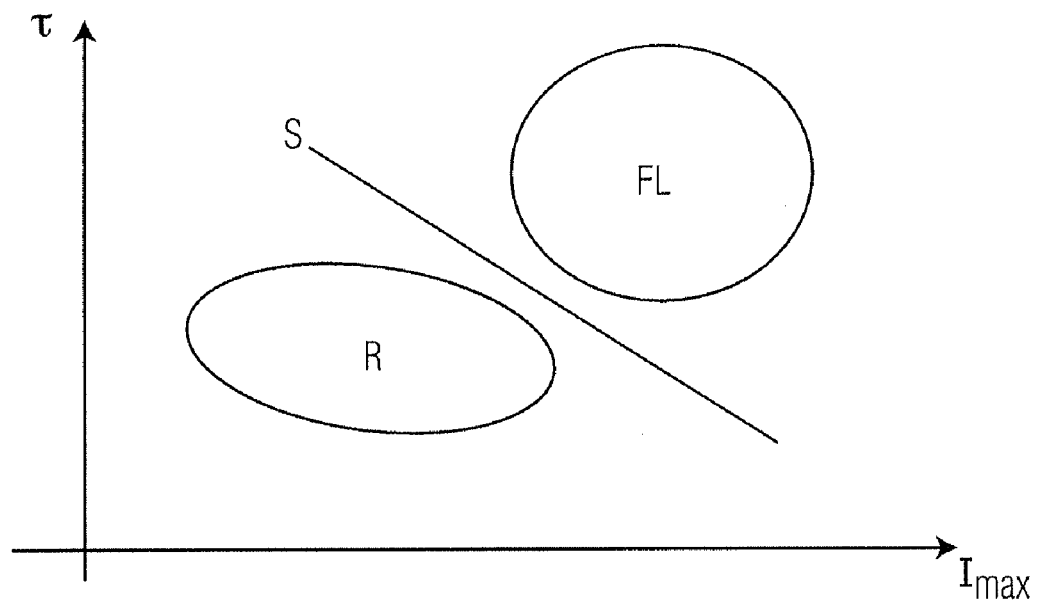
FIG. 2 is a schematic representation of a possible distribution of maximum intensities and lifetimes of light spots.

FIG. 2 is a schematic representation of the distribution of the light spots along the axes "lifetime τ" and "maximum intensity of the light spot". In the case shown, all light spots are within two regions that are separated from each other. Since reflectors are only detected when they are near one's own vehicle, they have a shorter lifetime τ than vehicle lights that are already detected when they are far away. As shown in FIG. 1, vehicle lights have a high final intensity, i.e. a high maximum intensity $I_{max}$ in the course of their lifetime τ. The maximum intensity $I_{max}$ of reflectors is usually, but not always, lower. In some cases, also the lifetime τ of a vehicle light and that of a reflector may be comparable. If both parameters are taken into consideration, as shown in FIG. 2, it will be possible to distinguish between the image spots of vehicle lights (FL) and those of reflectors (R) more reliably; the two regions can be clearly assigned. Usually, the regions (FL) and (R) do not overlap at all (see example in FIG. 2). The "threshold value" becomes a boundary line S that separates the two regions (FL) and (R) from each other. In FIG. 2, the boundary line S is a straight line, but it could also be a curve. In contrast to the representation in FIG. 2, the two regions (FL) and (R) could also overlap. In that case, a boundary line could be drawn through the valley between the two peaks of the overall distribution. However, distinguishing on the basis of two parameters (boundary line) will always be more reliable than distinguishing on the basis of one parameter (threshold value). By taking into consideration three parameters, reliability might be further increased. In that case, one would fix a boundary area for separating the subspaces (FL) and (R) from each other.

Figure 3:
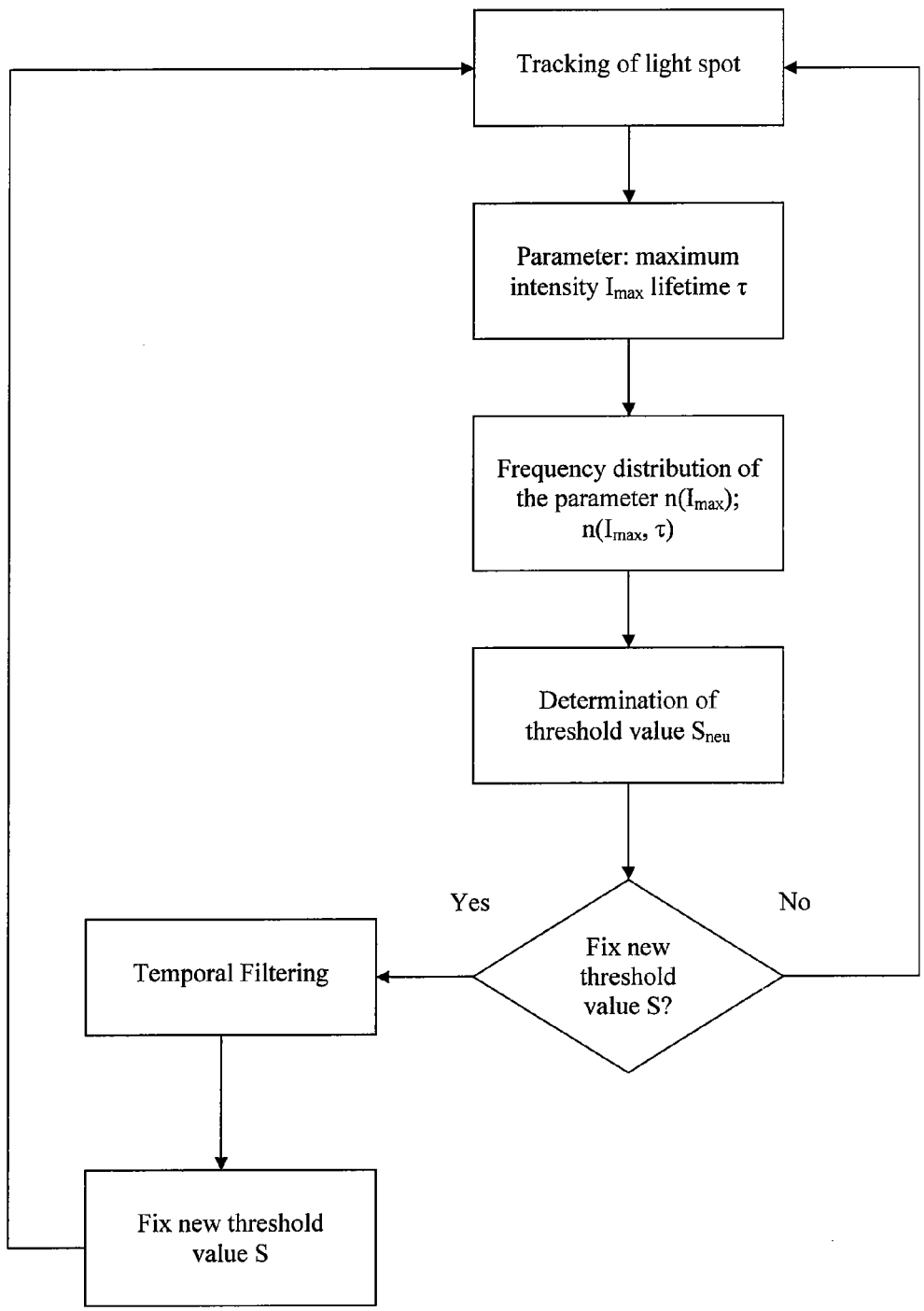
FIG. 3 shows a flow chart of the method for determining at least one threshold value for distinguishing between reflectors and vehicle lights in the dark.

FIG. 3 shows a flow chart for a corresponding method for adapting the threshold value. The first threshold value $S_0$ is plausibly preset. For example, it may be determined from an initial distribution as it is shown in FIG. 1 or in FIG. 2. As an alternative, a suitable threshold value $S_0$ may be determined from a calibration where a trainer distinguishes between reflectors and vehicle lights.

A light spot is tracked at the beginning of each cycle of the method. From measured values of the light spot in the course of the series of images, at least one parameter, for example the lifetime τ or the maximum intensity $I_{max}$, is determined afterwards.

The determined parameter value is included in the present frequency distribution n. It is possible to use a cumulative frequency distribution n that includes all parameter values that have appeared since the start of the method, but it is also possible to use a frequency distribution n that always includes the latest 1000 parameter values, for example. In the next step, this frequency distribution n is evaluated, wherein methods of decision theory may be applied. However, one may also proceed as described in connection with the explanation of FIG. 1 or FIG. 2. It is the aim of this evaluation to determine the optimum threshold value $S_{neu}$ for the present frequency distribution n. If the determined threshold value $S_{neu}$ corresponds to the present threshold value S, it will not be necessary to fix a new threshold value, and the next cycle of the method will start. If the determined threshold value $S_{neu}$ is different from the present threshold value S, the threshold value S will be fixed according to the determined threshold value $S_{neu}$ by means of temporal filtering, and the next cycle of the method will start. In contrast to the representation in the flow chart, temporal filtering could also be carried out before the threshold value $S_{neu}$ is determined. The most important thing is that the threshold value S is checked and, if necessary, adapted in each cycle. For example, if all intensities are decreasing in time on account of decreasing camera sensor sensitivity, the threshold value S will also be decreased according to this method, wherein the reliability of distinguishing between vehicle lights and reflectors is maintained.

The adaptation of the threshold value S ensures the reliable operation of the automatic light control system, because the threshold value S is an essential criterion for the current distinction made by an automatic light control system. For example, if a current intensity value of a light spot in an individual image recorded by the camera sensor is above the threshold value S for the first time, it will be decided that the light spot cannot be a reflector any more, but that it is an oncoming vehicle light so that the headlights have to be dipped.

The invention claimed is:

1. A method for determining at least one threshold value S for distinguishing, in the dark, between oncoming vehicle lights and reflectors that are recorded as light spots by a camera sensor oriented towards the surroundings of a vehicle, comprising:
   recording a series of images of the surroundings of the vehicle with the camera sensor;
   tracking at least one light spot in the series of images is tracked;
   determining, after tracking of the at least one light spot is completed, at least one parameter of the at least one light spot in the series of images; and
   adapting a threshold value S by:
      including the determined at least one parameter value in a frequency distribution n for the parameter of several light spots that all have been tracked over several images;
      determining, from the frequency distribution of the previously determined parameter values, a threshold value $S_{neu}$ for distinguishing between vehicle lights and reflectors; and
      fixing, after temporal filtering, a new threshold value S for distinguishing between reflectors and vehicle lights.

2. The method according to claim 1 wherein the temporal filtering is a temporal low-pass filtering.

3. The method according to claim 1, wherein the threshold value $S_{neu}$ for distinguishing between reflectors and vehicle lights is determined from the frequency distribution n of the previously determined parameter values by applying methods of decision theory.

4. The method according to claim 1, wherein the maximum intensity $I_{max}$ of a light spot is used as a parameter.

5. The method according to claim 4, wherein the lifetime $\tau$ of a light spot is used as a second parameter.

* * * * *

UNITED STATES PATENT AND TRADEMARK OFFICE
CERTIFICATE OF CORRECTION

PATENT NO.        : 8,391,558 B2
APPLICATION NO.   : 12/739477
DATED             : March 5, 2013
INVENTOR(S)       : Krökel et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 376 days.

Signed and Sealed this

First Day of September, 2015

Michelle K. Lee
*Director of the United States Patent and Trademark Office*